(12) United States Patent
Winger

(10) Patent No.: US 8,537,277 B2
(45) Date of Patent: Sep. 17, 2013

(54) DEINTERLACING AND FILM AND VIDEO DETECTION WITH CONFIGURABLE DOWNSAMPLING

(75) Inventor: Lowell L. Winger, Waterloo (CA)

(73) Assignee: LSI Corporation, San Jose, CA (US)

( * ) Notice: Subject to any disclaimer, the term of this patent is extended or adjusted under 35 U.S.C. 154(b) by 1583 days.

(21) Appl. No.: 12/050,311

(22) Filed: Mar. 18, 2008

(65) Prior Publication Data
US 2009/0237557 A1 Sep. 24, 2009

(51) Int. Cl.
*H04N 7/01* (2006.01)
*H04N 5/04* (2006.01)

(52) U.S. Cl.
USPC ........... 348/448; 348/441; 348/452; 348/458; 348/700; 348/701

(58) Field of Classification Search
USPC .................................. 348/448, 452, 700, 701
See application file for complete search history.

(56) References Cited

U.S. PATENT DOCUMENTS 7,800,692 B2 * 9/2010 Wredenhagen et al. ...... 348/449
7,944,503 B1 * 5/2011 Zhai et al. ..................... 348/452

* cited by examiner

*Primary Examiner* — Vivek Srivastava
*Assistant Examiner* — Jason Thomas
(74) *Attorney, Agent, or Firm* — Christopher P. Maiorana, PC

(57) ABSTRACT

A system having a memory and a processor is disclosed. The memory may be arranged as (i) a first pipeline to buffer a plurality of full resolution fields and (ii) a second pipeline to buffer a plurality of low resolution fields. The processor is generally configured to (i) receive a particular one or more of the full resolution fields and a particular one or more of the low resolution fields from the memory and (ii) generate a film mode signal based on the particular low resolution fields, the film mode signal indicating a current mode among a plurality of pull-down modes related to a current field being deinterlaced.

20 Claims, 6 Drawing Sheets

DEINTERLACING AND FILM AND VIDEO DETECTION WITH CONFIGURABLE DOWNSAMPLING

FIELD OF THE INVENTION

The present invention relates to video deinterlacing generally and, more particularly, to a method and/or apparatus for implementing deinterlacing and film and video detection with configurable downsampling.

BACKGROUND OF THE INVENTION

The tasks of video deinterlacing and film-mode detection challenge conventional deinterlacers to achieve a best quality for a minimal memory bandwidth cost. Part of the challenge is a lack of flexibility to trade off memory bandwidth and quality in the conventional deinterlacers. High quality state-of-the-art video deinterlacers use multiple fields of video buffered in a memory to create progressive frames for display. Additionally, high quality state-of-the-art film mode detection units (that are typically used with deinterlacers) use multiple fields from the memory.

Some existing deinterlacers and conventional film mode detectors are designed to use subsampled or decimated fields to save memory storage and bandwidth. However, quality suffers when the subsampled/decimated fields are used for generating the progressive frames. Other existing devices use fewer fields or more fields of video, with or without various color or chrominance components, as inputs to the deinterlacer modules and the film mode detection modules. The varying numbers of fields are used to trade off quality for memory bandwidth.

The existing solutions do not permit configurable and/or flexible use of downsampling/decimation. In particular, the resolution of the various fields consumed, as stored in an external memory, is consistent in existing solutions. For example, existing devices do not simultaneously store different resolution versions of the same field in the external memory. Furthermore, the existing solutions are not configurable such that a first specified field resolution may be used for stationary pixel checking and/or film mode detection, while a second specified field resolution may be used for pixel generation by the deinterlacing unit. The existing solutions do not write the reduced resolution versions of the fields back to the external memory to be used later for the processing of subsequent fields. Still further, the existing solutions are not configurable in the amount and type of decimation that is used depending on the type of film mode detected.

SUMMARY OF THE INVENTION

The present invention concerns a system comprising a memory and a processor. The memory may be arranged as (i) a first pipeline to buffer a plurality of full resolution fields and (ii) a second pipeline to buffer a plurality of low resolution fields. The processor is generally configured to (i) receive a particular one or more of the full resolution fields and a particular one or more of the low resolution fields from the memory and (ii) generate a film mode signal based on the particular low resolution fields, the film mode signal indicating a current mode among a plurality of pull-down modes related to a current field being deinterlaced.

The objects, features and advantages of the present invention include providing a method and/or apparatus for implementing deinterlacing and film and video detection with configurable downsampling that may (i) save memory bandwidth, (ii) utilize reduced resolution fields for film mode detection, (iii) utilize reduced resolution fields for stationary pixel detection, (iv) maintain parallel pipelines of full resolution fields and reduced resolution fields in an external memory and/or (v) discard reduced resolution fields that are no longer useful from the external memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
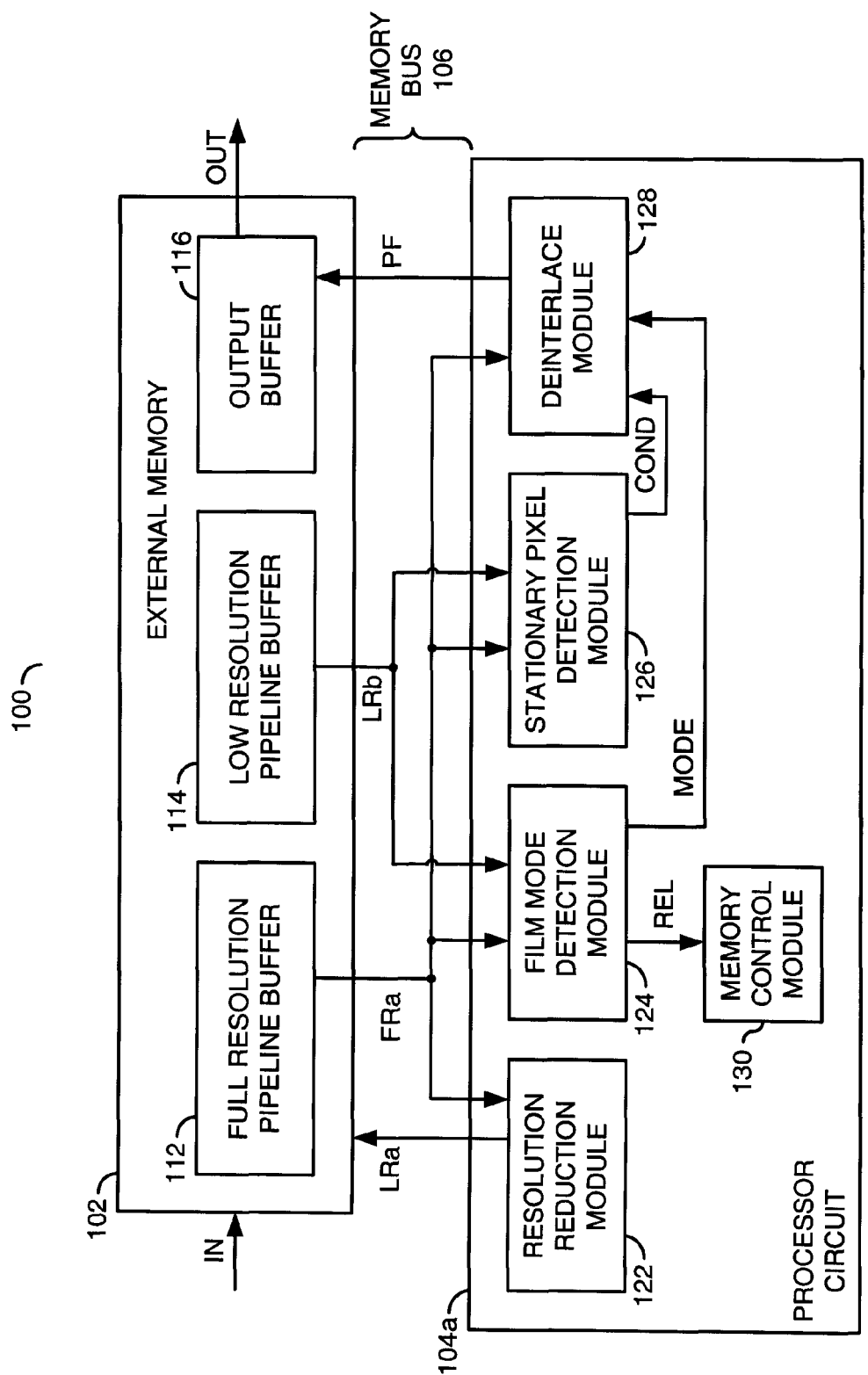
FIG. 1 is a block diagram of a first example embodiment of a system in accordance with a preferred embodiment of the present invention.

Referring to FIG. 1, a block diagram of a first example embodiment of a system 100 is shown in accordance with a preferred embodiment of the present invention. The system (or apparatus) 100 may implement a video deinterlacer. The system 100 is generally operational to deinterlace fields received in an input signal (e.g., IN) and presented progressive frames in an output signal (e.g., OUT). The system 100 generally comprises a memory (or module) 102 and a circuit (or module) 104a in communication with each other through a bus 106. Interlaced fields within the signal IN may be written into the memory 102. The progressive frames may be read from the memory 102 via the signal OUT.

The memory 102 may be operational to temporarily buffer the interlaced fields and the progressive frames. The memory circuit 102 may be implemented as a single data rate (SDR) dynamic random access memory (DRAM) or a double data rate (DDR) DRAM. Other memory technologies may be implemented to meet the criteria of a particular application. The memory 102 is generally fabricated on an individual chip (or die) separate from the circuit 104a.

The circuit 104a may implement a processor circuit. The circuit 104a is generally operational to perform field reductions, film mode detection, stationary pixel detection and deinterlacing of the interlaced fields to create the progressive frames. The circuit 104a is generally fabricated on an individual chip (or die) separate from the memory 102.

The bus 106 generally carries the fields and the frames between the memory 102 and the circuit 104a. The fields may exist as full resolution fields (e.g., FRES) and reduced (or low) resolution fields (e.g., LRES). The LRES fields may be generated by one or more of a variety of reduction methods. Two main groups of LRES fields may be half-horizontal (e.g., HRES) fields and half-vertical-and-half-horizontal (e.g., QRES) fields. The deinterlaced frames may exist at the full resolution.

The memory 102 may be arranged as several pipeline buffers. A first buffer 112 may store the FRES fields. A second buffer 114 may store the LRES fields. A third buffer 116 may store the progressive frames.

The circuit 104a generally comprises a module (or block) 122, a module (or block) 124, a module (or block) 126, a module (or block) 128 and a module (or block) 130. A signal (e.g., LRa) may carry LRES fields from the module 122 to the buffer 114. The FRES fields may be conveyed from the buffer 112 to the modules 122, 124, 126 and/or 128 by a signal (e.g., FRa). A signal (e.g., LRb) may carry LRES fields from the buffer 114 to the modules 124 and/or 126. The module 128 may generate and present a signal (e.g., PF) to the buffer 116. A signal (e.g., MODE) may be generated by the module 124 and presented to the module 128. A signal (e.g., COND) may be generated and presented from the module 126 to the module 128. The module 124 may also present a signal (e.g., REL) to the module 130.

The module 122 may implement a resolution reduction module. The module 122 is generally operational to reduce the size of the FRES fields received in the signal FRa to create the LRES fields in the signal LRa. Reduction methods (or procedures) implemented by the module 122 may include, but are not limited to, decimation, sub-sampling and scaling.

The module 124 may implement a film mode detection module. The module 124 is generally operational to detect if the LRES fields received in the signal LRa have been created from normal film pictures (e.g., 24 pictures per second) and if so, using which particular type of pull-down (e.g., 3:2 pull-down and/or 2:2 pull-down). Results of the mode detection may be presented in the signal MODE to the module 128. The module 124 may also generate the signal REL to inform the module 130 that a given LRES field just used in the film mode detection technique may be released from the buffer 114.

The module 126 may implement a stationary pixel detection module. The module 126 may be operational to determine if the pixels in a current field being deinterlaced are generally in a stationary condition or a non-stationary condition relative to one or more other fields. The detection may be performed on the current field at the low resolution or at the full resolution. The other fields used in the comparison are generally LRES fields. Results of the detection may be presented to the module 128 in the signal COND.

The module 128 may implement a deinterlacer. The module 128 is generally operational to deinterlace the current field received in the signal FRa to generate the progressive frames in the signal PF. Deinterlacing may be performed (i) using only the current field (e.g., the "bob" method) or (ii) using the current field and one or more other fields (e.g., the "weave" method) with or without motion compensation. Selection of which particular deinterlacing method to use is generally determined by the information received in the signal MODE and the signal COND.

The module 130 may implement a memory controller. The module 130 is generally operational to control buffering and removal of the fields and frames in the memory 102. For example, the module 130 may remove (or release) one or more old LRES fields when no longer useful to the module 124. Which LRES fields to release and when to release may be identified by information received in the signal REL.

In a first operational mode of the system 100, a first FRES field may be read from the buffer 112 in the memory 102 by the module 122 at the full resolution and optionally written back out to the buffer 114 at a configurable reduced resolution (e.g., the half-resolution or the quarter-resolution). Later, the module 124 may read one or more of the LRES fields from the buffer 114, rather than the FRES fields from the buffer 112, to perform the film mode detection. After the last (oldest) LRES field used by the module 124 for the mode detection is read from the buffer 114, the corresponding space within the memory 102 may be released.

In some embodiments, the system 100 may be reduced to a simpler arrangement having only the module 122, the module 124 and the module 130. Furthermore, the functionality of the modules 122 and 130 may be integrated into the module 124 to create a standalone film detection module. As such, the standalone film mode detection module may use additional system memory to save system bandwidth and processing cycles. In another embodiments, the modules 122, 124 and 130 may be combined into a standalone joint 3:2/2:2 film mode detect module.

Figure 2:
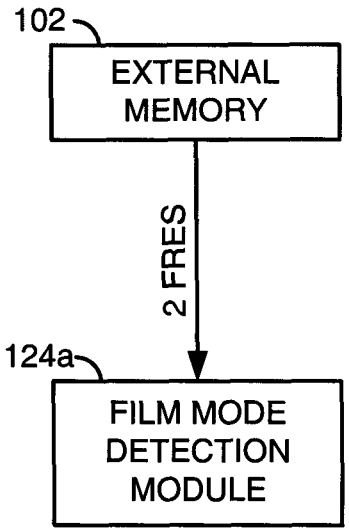
FIG. 2 is a functional block diagram of a first example operational mode of a standalone 3:2 film mode detection module.
Figure 3:
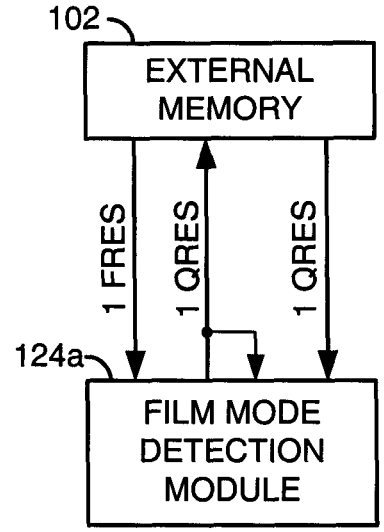
FIG. 3 is a functional block diagram of a second example operational mode of the 3:2 film mode detection module.

Referring to FIGS. 2 and 3, functional block diagrams of two example operational modes of a standalone 3:2 film mode detection module 124a are shown. The module 124a is generally configurable to operate in one of two selectable modes, depending upon an available bandwidth versus storage criteria. In a first mode (e.g., FIG. 2), the module 124a may (i) read two FRES fields (e.g., a current field N and a field N+2) and (ii) determine the film mode based on the two FRES fields. In a second mode (e.g., FIG. 3), the module 124a may (i) read an FRES field (e.g., field N+2) from the memory, (ii) decimate the FRES field N+2 to generate a QRES field N+2, (iii) write the QRES field N+2 to the buffer 114, (iv) read a current QRES field N, (v) detect the mode using the QRES field N and the QRES field N+2 and then (vi) release the QRES field N.

Figure 4:
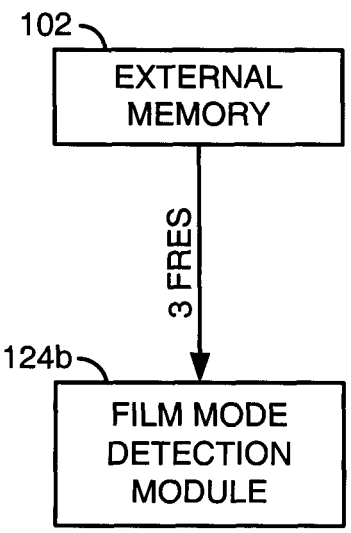
FIG. 4 is a functional block diagram of a first example operational mode of a joint 3:2/2:2 film mode detection module.
Figure 5:
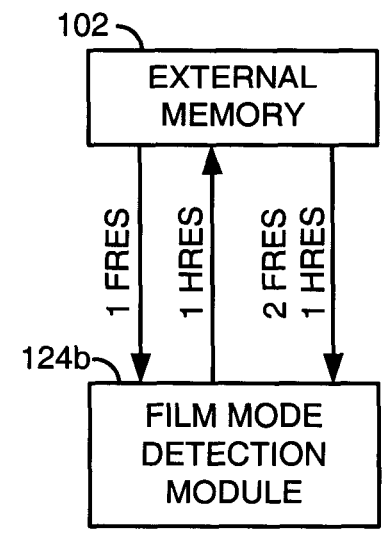
FIG. 5 is a functional block diagram of a second example operational mode of the 3:2/2:2 film mode detection module.

Referring to FIGS. 4 and 5, functional block diagrams of two example operational modes of a joint 3:2/2:2 film mode detection module 124b are shown. The module 124b may be configured to operate in one of two selectable modes depending upon an available bandwidth versus storage criteria. In a first mode (e.g., FIG. 4), the module 124b may (i) read several FRES fields (e.g., field N, field N+1 and field N+2) from the memory 102 and then (ii) determine the film mode based on the three FRES fields. In a second mode (e.g., FIG. 5), the module 124b may (i) read an FRES field (e.g., field N+2) from the buffer 112, (ii) decimate the field N+2 to create an HRES field N+2, (iii) write the HRES field NT2 to the buffer 114, (iv) read two FRES fields (e.g., field N and field N+1) from the buffer 112 and a HRES field N from the buffer 114 and (v) determine the file mode from the two FRES fields N, N+1 and the single HRES field N.

Figure 6:
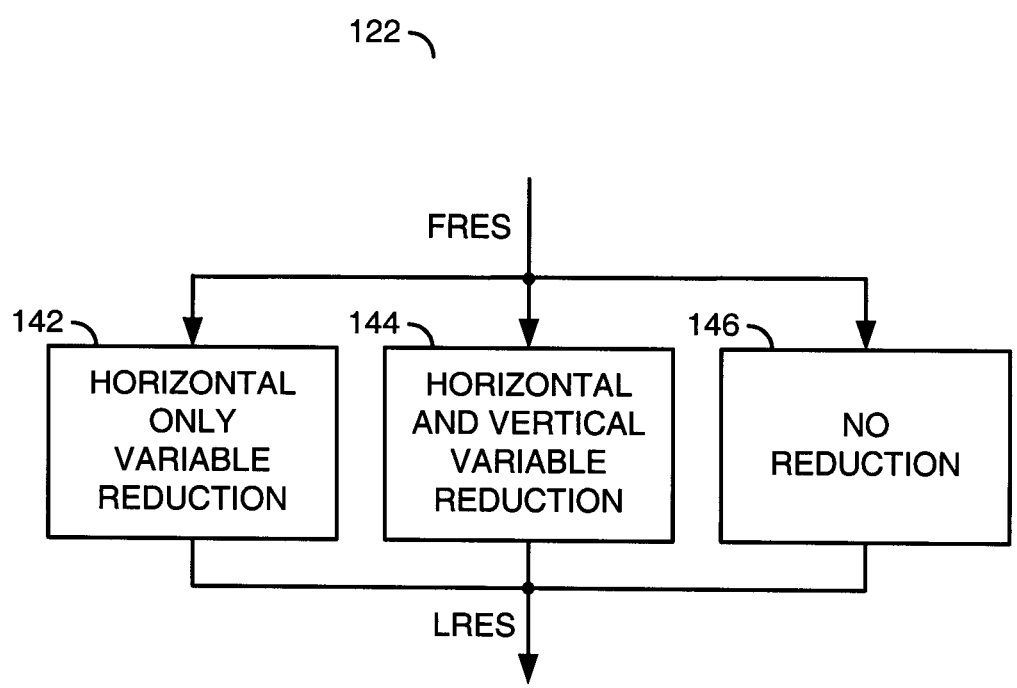
FIG. 6 is a functional block diagram of an example implementation of a resolution reduction module.

Referring to FIG. 6, a functional block diagram of an example implementation of the resolution reduction module 122 is shown. The module 122 generally comprises a step (or block) 142, a step (or block) 144 and a step (or block) 146. For each FRES field being decimated, the module 122 may proceed through a single step 142, 144 or 146. In the step 142, the module 122 may perform a horizontal-only variable resolution reduction of the FRES field to create an LRES field. An amount of variable resolution reduction may include, but is not limited to, a 2× resolution reduction, a 4× resolution reduction, or a fractional resolution reduction (e.g., 1.5×). In the step 144, the module 122 may perform both a horizontal variable resolution reduction and a vertical variable resolution reduction on the FRES field to create the LRES field. The amount of variable resolution reduction in the horizontal dimension may be set independent of the amount of variable reduction in the vertical dimension. In the step 146, the module 122 may not perform any resolution reduction on the FRES fields.

Figure 7:
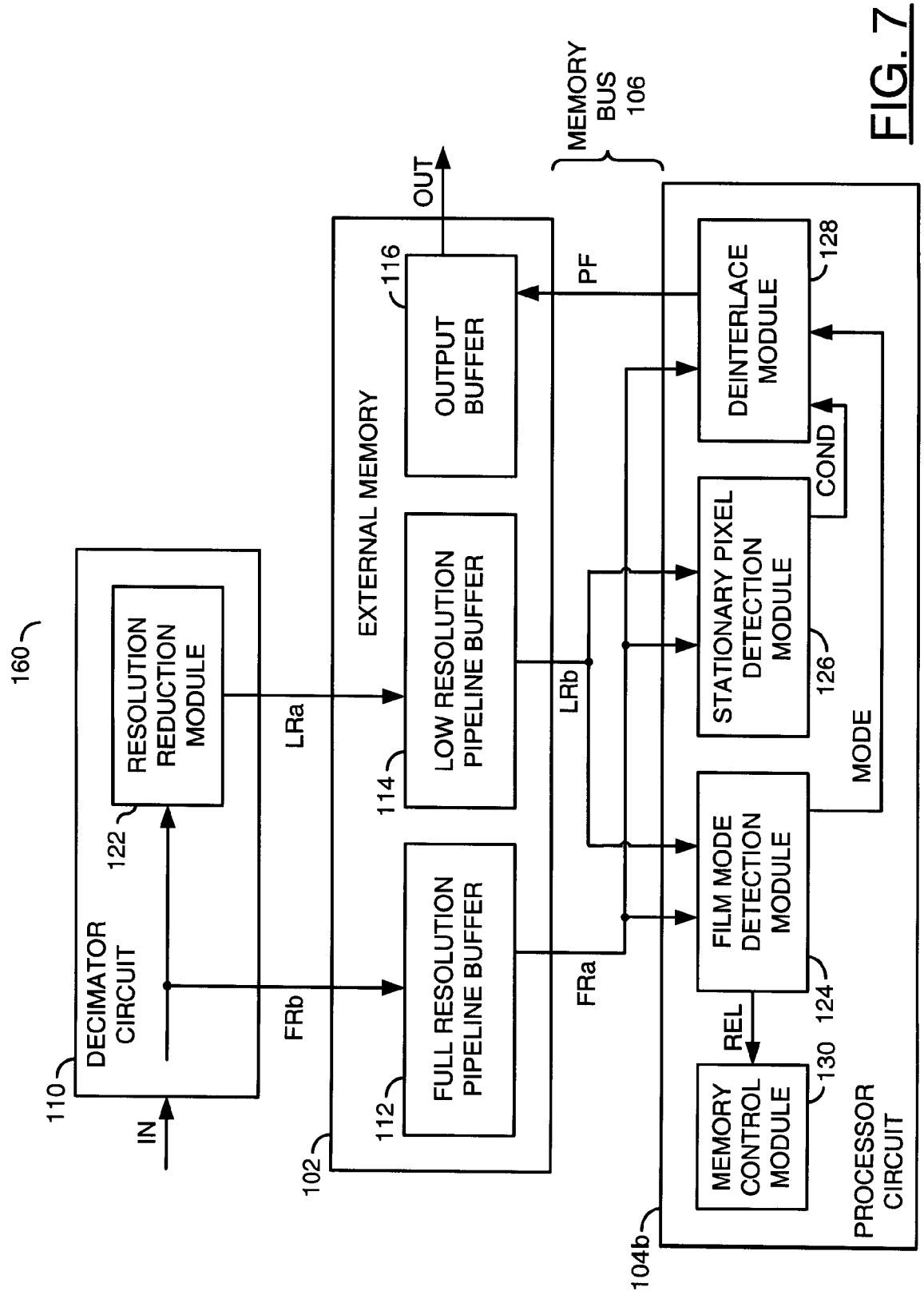
FIG. 7 is a block diagram of a second example embodiment of the system.

Referring to FIG. 7, a block diagram of a second example embodiment of a system 160 is shown. The system (or apparatus) 160 may be an alternate embodiment of the system 100. As such, elements common to both the systems 100 and 160 may be referenced by the same reference numbers. The system 160 generally comprises the memory 102, a circuit (or module) 104*b*, the bus 106 and a circuit (or module) 110. The circuit 110 may receive the signal IN. A signal (e.g., FRb) may be generated and presented from the circuit 110 to the buffer 112. The signal LRa may be generated by the circuit 110 and presented to the buffer 114.

Within the memory 102, the buffer 112 may be maintained for use by the module 128 in generating the progressive frame pixels at a highest quality. The buffer 114 may also be maintained for use by both the module 124 and the module 126. Furthermore, the buffer 116 may be maintained for use by the module 128 to store the progressive frames.

The circuit 104*b* generally comprises the circuit 124, the circuit 126, the circuit 128 and the circuit 130. In the circuit 104*b*, the module 124 may be maintained for detecting the film mode. The module 126 may also be maintained to perform the stationary pixel detection. Furthermore, the module 128 may be maintained to create the progressive frames. The module 130 may be maintained for controlling the fields and frames in the memory 102. However, the module 122 may be moved from the circuit 104*b* to the circuit 110.

The circuit 110 may be implemented as a video decoder circuit, a video capture circuit or another external circuit that may generate the LRES fields to be used by the module 124. As such, the circuit 110 may be generally referred to as a decimator circuit. The circuit 110 may include the module 122. Therefore, the circuit 104*b* may not create the LRES fields in the signal LBa, as does the circuit 104*a*. In the system 160, the reduced resolution field pipeline buffer 114 may remain in the memory 102. However, the circuit 104*b* may read the appropriate FRES fields and the LRES fields without writing any LRES fields back to the memory 102.

The circuit 104*b* may optionally adaptively operate in either a film mode or a video mode based on the detection results of the module 124. When deinterlacing in the video mode, the stationary pixel condition results from the module 126 may be used by the module 128 to improve the video mode deinterlacing quality by adaptively choosing to "weave" stationary pixels from one or more adjacent fields into the current field to generate a progressive frame. When deinterlacing in the film mode, the module 128 may choose to "bob" the pixels from within the current field to generate a progressive frame.

Figure 8:
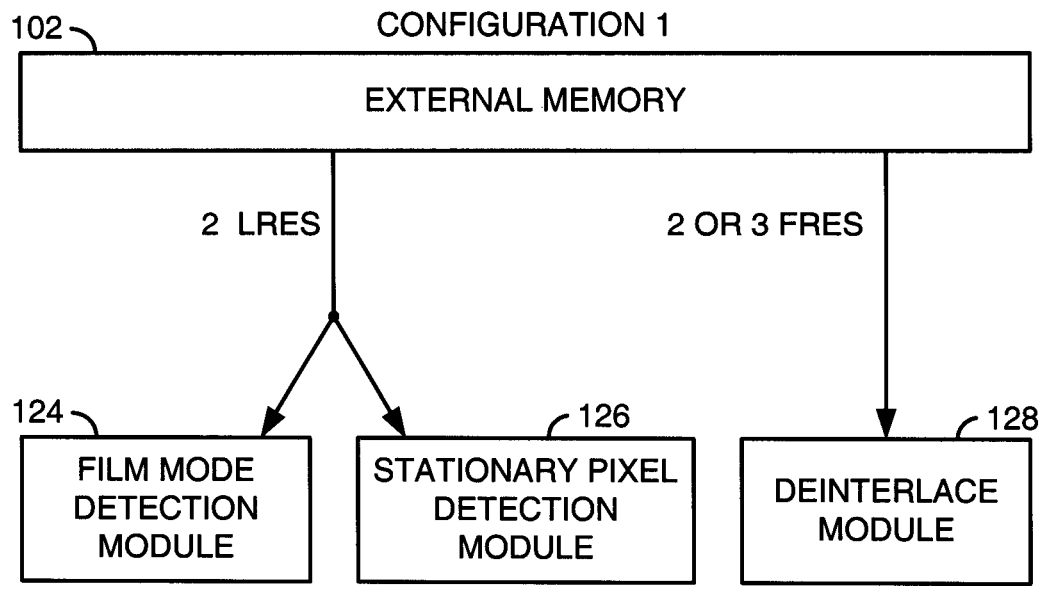
FIG. 8 is a functional block diagram of a first example configuration of the system.

Referring to FIG. 8, a functional block diagram of a first example configuration of the system 160 is shown. In the system 160, both the module 124 and the module 126 may use one or more common LRES fields, while the module 126 generally uses one or more of the FRES fields. In a first example configuration (or mode) where only 3:2 film mode defection is performed, two LRES fields may be read from the memory 102 for both film mode detection and stationary pixel detection. Two or three additional FRES fields may be read at the higher resolution for generation of the deinterlaced frame.

Figure 9:
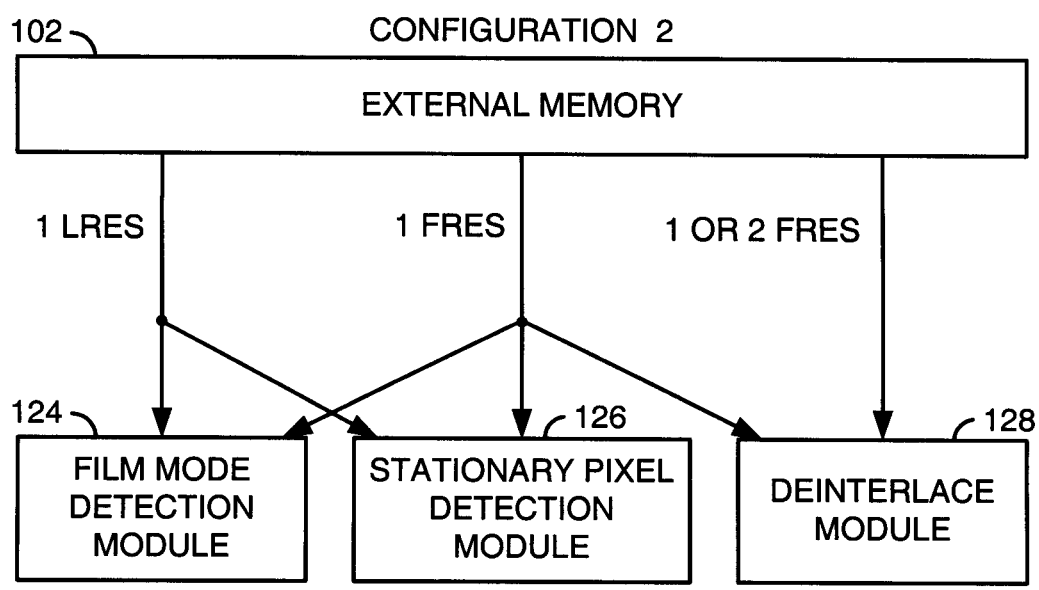
FIG. 9 is a functional block diagram of a second example configuration of the system.

Referring to FIG. 9, a functional block diagram of a second example configuration of the system 160 is shown. In the second configuration (or mode) where only 3:2 film detection is performed, a first field at the low resolution may be read from the memory 102 for both film mode detection and stationary pixel detection. A second field at the high resolution may be read from the memory 102 and shared among the film mode detection, the stationary pixel detection and the deinterlacing pixel generation. A third field, and optionally a fourth field, at the full resolution may be read from the memory 102 for the deinterlacing pixel generation.

Figure 10:
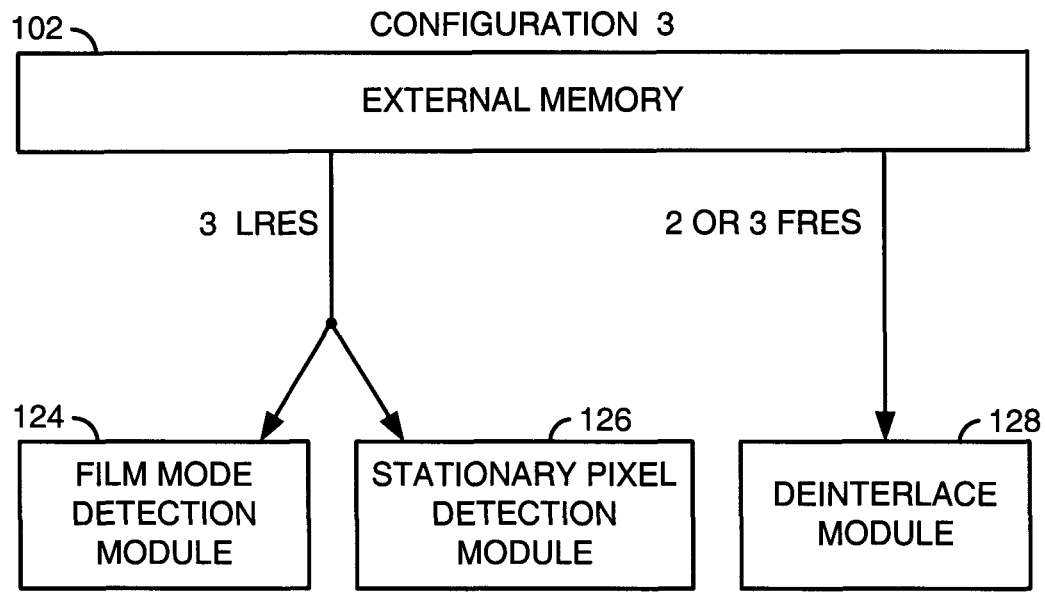
FIG. 10 is a functional block diagram of a third example configuration of the system.

Referring to FIG. 10, a functional block diagram of a third example configuration of the system 160 is shown. In the third configuration (or mode) in which both 3:2 and 2:2 film detections may be performed, three LRES fields may be read from the memory 102 for use in both film mode detection and stationary pixel detection. Two or three FRES fields may be read from the memory 102 for use in the deinterlacing pixel generation.

Figure 11:
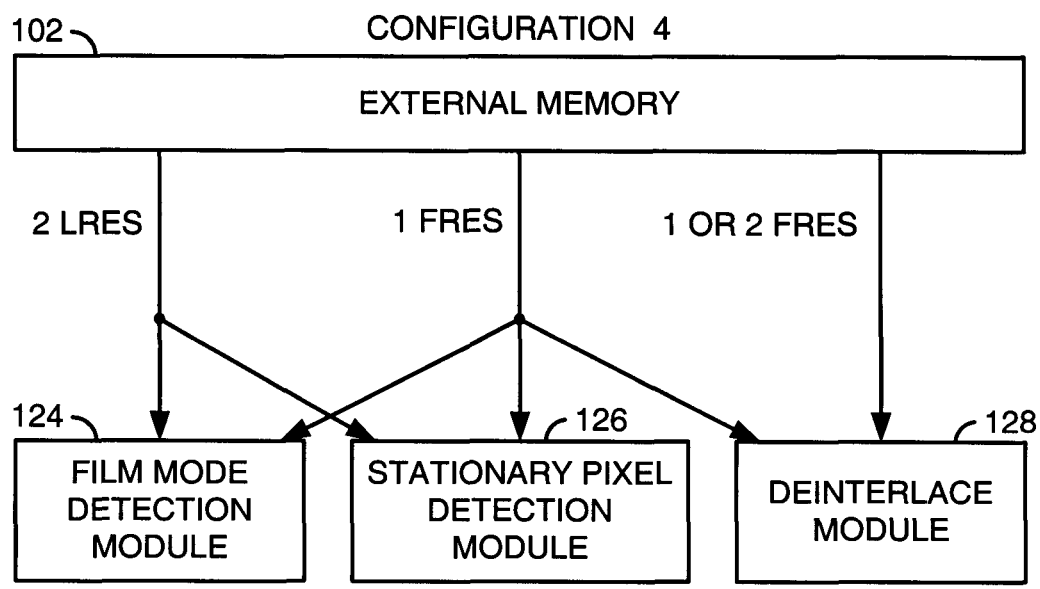
FIG. 11 is a functional block diagram of a fourth example configuration of the system.

Referring to FIG. 11, a functional block diagram of a fourth example configuration of the system 160 is shown. In the fourth configuration (or mode) in which both 3:2 and 2:2 film detections may be performed, two LRES fields may be read from the memory 102 for use in both film mode detection and stationary pixel detection. A single FRES field may be read for use in all of the film mode detection, the stationary pixel detection and the deinterlacing. Two or a single FRES field may be read from the memory 102 for additional use (two or three FRES fields total) in the deinterlacing pixel-generation.

All of the above configurations generally consider the LRES fields to have been pre-generated by another circuit (e.g., circuit 110) and stored in the memory 102. In other configurations without an external resolution reduction module, the processor circuit (e.g., 104*a*) may read the first FRES field, decimate the FRES field and write back to the memory an LRES field for later use (e.g., for use in the other fields that are read by the circuit 104*a* at reduced resolution).

The present invention generally provides two different resolution field pipeline buffers maintained in an external memory for video display processing. A first pipeline buffer may store full-resolution fields in support of deinterlacing. A second pipeline buffer may store low-resolution fields in support of film mode detection and stationary pixel detection. In some embodiments, the circuit 104*a* may write out to memory 102 a reduced resolution first field and then read from the memory 102 a reduced resolution second field and potentially a third field. Furthermore, the module 122 may provide configurable amounts of resolution reduction and/of configurable types of reduction (e.g., none, horizontal only, vertical and horizontal) with varying amounts of decimation.

The present invention generally provides a high quality film/deinterlace unit utilizing (i) three or more fields of bandwidth if 3:2 film detection is supported. Two of the three fields may be used to generate a progressive frame and two of the fields may be used for both stationary pixel detection and 3:2 repeat field pattern detection. A single field may be shared between the detection operations and the deinterlacing operation. For example, if the current field is N, then (i) a field N+1 may be used with the field N to generate the frame and (ii) a field N+1 and a field N+3 may be used together for the 3:2 film mode detection and the stationary pixel detection. Some embodiments may not share a common field do to delay in the film-mode detection decision making.

While in a film mode, the system may weave the field N with a field N−1. Therefore, another configuration may utilize four fields, where the field N and either the field N+1 or the field N−1 may be used for generating a progressive frame. Where a field M and a field M+2 may be at some arbitrary look-ahead position (e.g., M>=N+1, if M=N+1) to do film/stationary detection in advance, the bandwidth situation generally fluxuates between three and four fields. Three of the fields may be used for video mode, three fields for film mode when weaving with the field N+1, and four fields may be used in the film mode when weaving with the field N−1.

A combined high quality film/deinterlace circuit implementing the present invention generally utilizes four or more fields of bandwidth if 2:2 film detection is supported. In such a situation, the 3:2 detection may use no additional bandwidth, but may be shared with the 2:2 detection. Two of the fields may be used to generate a progressive frame and three fields may be used to do both the stationary pixel detection and the 2:2 repeat field pattern detection, and a single field may be shared. For example, if the current field is the field N, (i) the field N+1 may be used with the field N to generate the frame and (ii) the field N+1, the field N+2, and a field N+3 may be used together for the 3:2/stationary pixel/2:2 detection. The fields may typically not all be temporally adjacent, such that the 3:2/stationary-pixel/2:2 detection is "looking-ahead" of the deinterlacing, in which case no fields sharing may be performed.

Under the present invention, the memory bandwidth may be reduced by having the fields used for the stationary check/film mode detection read from the memory in at reduced resolution. The memory may buffer (i) all of the fields if the reduced resolution versions are generated externally or (ii) all but the first read field if the reduced resolution fields are generated by the same circuit performing the stationary check/film mode detection.

Vertical decimation of fields generally impairs the quality of 2:2 film mode detection processes. However, vertical decimation may be beneficial for 3:2 detection processes. Horizontal decimation may also impair 2:2 film mode detection (to a much lesser extent than the vertical decimation), and potentially may be beneficial for 3:2 detection. For the above reasons, the present invention may use both horizontal resolution reduction and vertical resolution reduction by some factors when doing only 3:2 detection. The horizontal resolution reduction and the vertical resolution reduction may be not have the same reduction factor and may not use factors of 2. When 2:2 detection is being performed, the present invention may use only horizontal decimation/downscaling by some factor, such that the memory bandwidth is reduced.

The functions performed by the diagrams of FIGS. 1-11 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A system comprising:
    a memory arranged as (i) a first buffer configured to store a plurality of full resolution fields and (ii) a second buffer configured to store a plurality of low resolution fields, each of said low resolution fields being generated from a respective one of said plurality of full resolution fields; and
    a processor configured to (i) receive a particular one or more of said full resolution fields and a particular one or more of said low resolution fields from said memory and (ii) generate a film mode signal based on said particular one or more low resolution fields, said film mode signal indicating a current mode among a plurality of pull-down modes related to a current field being deinterlaced.

2. The system according to claim 1, wherein said generation of said film mode signal is further based on a select one of said particular full resolution fields.

3. The system according to claim 1, wherein said processor is further configured to generate a condition signal based on said particular low resolution fields, said condition signal indicating a current condition in said current field as either one of (i) a stationary pixel condition and (ii) a non-stationary pixel condition.

4. The system according to claim 3, wherein said generation of said condition signal is further based on a select one of said particular full resolution fields.

5. The system according to claim 3, wherein said processor is further configured to generate a deinterlaced frame from said current field in response to both (i) said current mode and (ii) said current condition.

6. The system according to claim 5, wherein both (i) said generation of said film mode signal and (ii) said generation of said deinterlaced frame share a common field of said particular full resolution fields.

7. The system according to claim 1, wherein said processor is further configured to generate a release signal after determining said current mode, said release signal indicating that a select one of said particular low resolution fields in said second buffer is no longer useful.

8. A system comprising:
    a decimator configured to generate a given one of a plurality of low resolution fields from a given one of a plurality of full resolution fields;
    a memory arranged as (i) a first buffer configured to store said full resolution fields and (ii) a second buffer configured to store said low resolution fields; and
    a processor configured to (i) receive a particular one or more of said low resolution fields and a particular one or more of said full resolution fields after said particular one or more low resolution fields is buffered in said memory and (ii) generate a film mode signal based on said particular one or more low resolution fields, said mode signal indicating a current mode among a plurality of pull-down modes related to a current field being deinterlaced.

9. The system according to claim 8, wherein said generation of said film mode signal is further based on a select one of said particular full resolution fields.

10. The system according to claim 8, wherein said processor is further configured to generate a condition signal based on said particular low resolution fields, said condition signal indicating a current condition in said current field as either one of (i) a stationary pixel condition and (ii) a non-stationary pixel condition.

11. The system according to claim 10, wherein said generation of said condition signal is further based on a select one of said particular full resolution fields.

12. The system according to claim 10, wherein said processor is further configured to generate a deinterlaced frame from said current field in response to both (i) said current mode and (ii) said current condition.

13. The system according to claim 12, wherein both (i) said generation of said film mode signal and (ii) said generation of said deinterlaced frame share a common field of said particular full resolution fields.

14. The system according to claim 8, wherein said processor is further configured to generate a release signal after determining said current mode, said release signal indicating that a select one of said particular low resolution fields in said second buffer is no longer useful.

15. A system comprising:
 a decimator configured to (i) generate a plurality of low resolution fields using a current reduction technique of a plurality of configurable reduction techniques, each of said low resolution fields being generated from a respective one of a plurality of full resolution fields;
 a memory arranged as (i) a first buffer configured to store said full resolution fields and (ii) a second buffer configured to store said low resolution fields; and
 a processor configured to (i) receive a particular one or more of said low resolution fields and a particular one or more of said full resolution fields from said memory and (ii) generate a film mode signal based on said particular one or more low resolution fields, said mode signal indicating a current mode among a plurality of pulldown modes related to a current field being deinterlaced.

16. The system according to claim 15, wherein said generation of said film mode signal is further based on a select one of said particular full resolution fields.

17. The system according to claim 15, wherein said processor is further configured to generate a condition signal based on said particular low resolution fields, said condition signal indicating a current condition in said current field as either one of (i) a stationary pixel condition and (ii) a non-stationary pixel condition.

18. The system according to claim 17, wherein said generation of said condition signal is further based on a select one of said particular full resolution fields.

19. The system according to claim 17, wherein said processor is further configured to generate a deinterlaced frame from said current field in response to both (i) said current mode and (ii) said current condition.

20. The system according to claim 19, wherein both (i) said generation of said film mode signal and (ii) said generation of said deinterlaced frame share a common field of said particular full resolution fields.

* * * * *